April 16, 1968  R. G. COKER ET AL  3,377,985

SIZING DEVICE FOR TUBULAR ARTICLES

Filed Aug. 31, 1967  2 Sheets-Sheet 1

INVENTORS
RICHARD G. COKER
CHARLES K. DUNLAP, Jr.

BY *J. Russell Foster*

ATTORNEY

April 16, 1968

R. G. COKER ET AL 3,377,985

SIZING DEVICE FOR TUBULAR ARTICLES

Filed Aug. 31, 1967

INVENTORS
RICHARD G. COKER
CHARLES K. DUNLAP, Jr.

BY *Russell Foster*

ATTORNEY 3,377,985
SIZING DEVICE FOR TUBULAR ARTICLES
Richard G. Coker and Charles K. Dunlap, Jr., Hartsville, S.C., assignors to Sonoco Products Company, Hartsville, S.C., a corporation of South Carolina
Filed Aug. 31, 1967, Ser. No. 664,826
5 Claims. (Cl. 118—101)

ABSTRACT OF THE DISCLOSURE

A tubular sizing device formed of a continuous resilient, helical convolution which in a preferred embodiment includes a tapering inner diameter and means connected at the free end of the helix for restraining diametric adjustment.

---

This invention relates to tube manufacturing apparatus and more particularly to a device for treating tubes formed from fibrous material.

In the manufacture of tubular articles and in particular wound tubes of fibrous material such as spirally wound or convolutely wound paper tubes, it is frequently necessary to provide a smooth, hard finish on the outer surface of such tubes to avoid marring delicate web material wound on the tube such as plastic film and the like. To obtain a smooth outer surface on the tubes, heated devices, commonly referred to as "sizing dies," are frequently used. Such "sizing dies" are usually provided with a passage through which the tube is advanced, the inner diameter of the passage being slightly less than the outer diameter of the tube so as to perform an "ironing" or "sizing" operation on the outer surface of the tube. In addition, a layer of material on the outer surface of the tube such as the outer paper ply is generally impregnated with a suitable impregnant such as a resinous material so that the compression and densification of the outer layer of material by the sizing die is accompanied by a heat setting or curing of the resinous material due to the heat of the die thereby producing a hard, smooth, outer surface free of irregularities on the tube.

As is well known, the techniques in use today for manufacturing paper tubes do not permit a close control of the outer diameters of tubes of any specific size so that there are continuous variations in the outer diameters of such tubes. Such inability to maintain close control of tube outer diameter results from variations in paper thickness, humidity conditions, winding tensions and the like. While some variation in the outer diameters of tubes processed in such dies is permitted, a sizing die having a passage diameter for accommodating a tube of a specific size is frequently unable to accommodate tubes having increased outer diameters produced by such variations in excess of the permitted variation and jamming occurs. Furthermore, a decrease in the outer diameter of the tube of the extent produced by such variations permits the tube to pass through the die without receiving any sizing treatment at all.

Accordingly, a primary object of this invention is to provide a new and novel sizing device for tubular articles.

Another object of this invention is to provide a new and novel sizing device for tubular articles such as paper tubes which produces a smooth, hard outer surface of the tubes.

Still another object of this invention is to provide a new and novel die for sizing tubular articles such as paper tubes which will accommodate and uniformly process tubes of a size for which the die is designed throughout any variation in tube outer diameter of the extent produced by variations common to present type tube manufacturing techniques.

A still further object of this invention is to provide a new and novel sizing die for tubular articles such as paper tubes which is self-adjusting to accommodate tubes having outer diameters which vary over a wide range both above and below the outer diameter of a standard tube size and which permits the sizing pressure of the die to be selectively adjusted throughout a wide range.

This invention further contemplates the provision of a new and novel sizing die for tubular articles such as paper tubes which may be heated in a simple and easy manner, which is simple and inexpensive in construction so as to be low in initial cost and which may be manufactured in any desired size to accommodate and uniformly treat tubes of any standard size regardless of variations in tube outer diameters resulting from tube manufacturing techniques.

Other objects and advantages of the invention will become apparent from the following description taken in connection with the accompanying drawings.

The objects stated above and other related objects in this invention are accomplished by providing a device for sizing a tubular article of fibrous material such as a paper tube which includes a support member and a helically shaped, tubular body member having adjacent convolutions. The adjacent convolutions of the body member have side edges which are arranged in side-by-side relationship. The body member convolutions define a central bore having an inner wall for accommodating a tubular article of a stnadard outer diameter advancing therethrough in tight-fitting, sizing engagement with the outer surface of the tubular article. Means are provided for supporting the body member on the support member to permit the introduction of the tubular article into the central bore through one end of the body member and means are provided for heating the body member. The body member convolutions are arranged to yieldingly expand diametrically to accommodate tubular articles within a range of outer diameters above and below a standard outer diameter while maintaining said tight-fitting, sizing engagement between the tubular article outer surface and the central bore inner wall.

The novel features which are believed to be characteristic of the invention are set forth with particularity in the appended claims. The invention itself, however, both as to its organization and method of operation may be best understood by reference to the following description taken in conjunction with the accompanying drawings in which:

Figure 1:
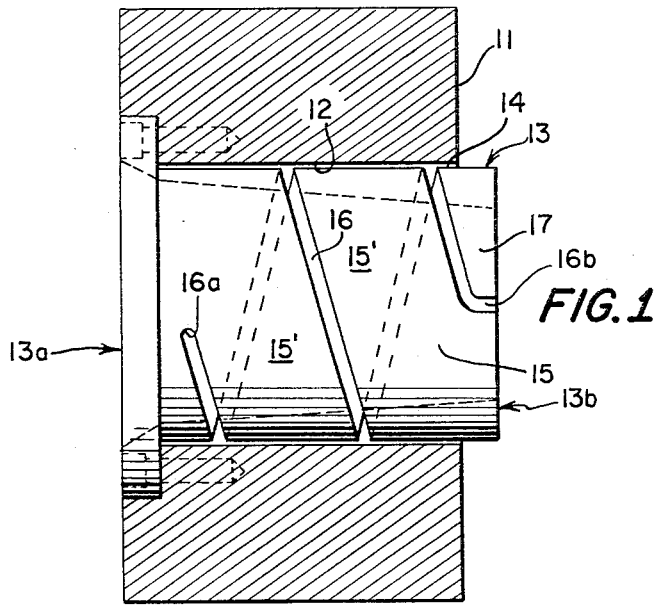
FIGURE 1 is a side view partially in section of a sizing device constructed in accordance with the invention.
Figure 2:
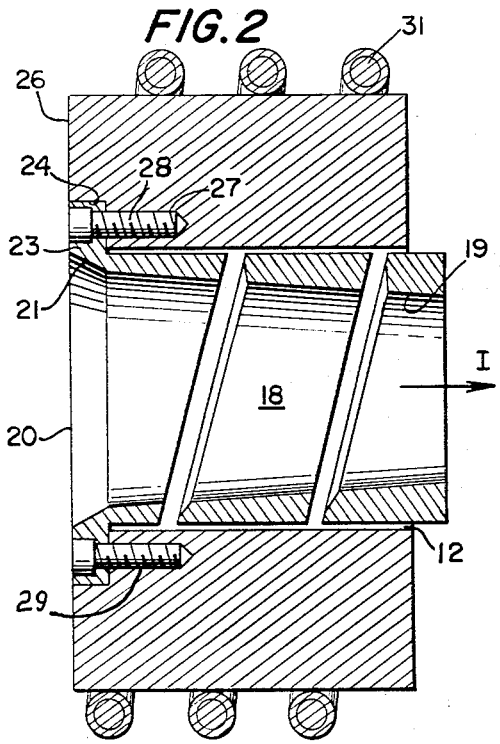
FIGURE 2 is a sectional view of the device of FIGURE 1.
Figure 3:
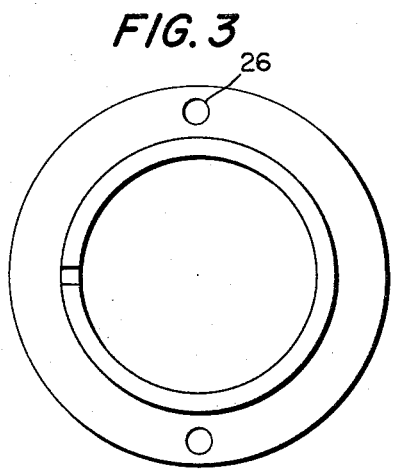
FIGURE 3 is an end view of a portion of the sizing device of FIGURE 1.

Referring now to the drawing, there is shown in FIGURES 1-3 one embodiment of the invention which includes a support member 11 which is preferably of annular shape and preferably formed from suitable heat conductive material such as metal or the like. The support member 11 is provided with a central bore 12 for accommodating a helically shaped, tubular body member 13 preferably formed of heat conductive material such as metal. As shown, the body member 13 is centrally arranged in radially spaced apart relationship with the support member central bore 12 and defines therewith an annular clearance space 14.

The helically shaped body member 13 preferably comprises a continuous strip or band 15 of metal or the like having adjacent convolutions 15'. The side edges of the adjacent convolutions 15' define therebetween a helically extending gap 16 which terminates in a closed end 16a adjacent one end 13a of the body member 13. The helical gap 16 terminates at its other end in a relatively short, axially extending portion 16b opening into the end edge of the other end 13b of the body member 13 to provide a free end 17 on the body member 13 preferably tapered as shown. The metal strip or band 15 has a thickness such that the body member 13 while possessing the rigidity of metal is, nevertheless, flexible to a limited extent. By way of example, a wall thickness approximately one fourth of an inch has been found to provide the outstanding results of the invention.

The body member 13 is provided with a central bore 18 defined by the inner wall 19 of the convolutions 15' which is preferably tapered radially outward adjacent the body member end 13a to form an opening 21 to permit the introduction of a tubular article into the body member central bore 18. The body member inner wall 19 is also preferably tapered radially inward, as shown, from the opening 21 to the other end 13b of the body member 13 for yieldingly accommodating a tubular article of a standard outer diameter advancing through the central bore 18 in the direction of the arrow I and thereby maintain the inner wall 19 in tight-fitting, sizing engagement with the outer surface of the tubular article.

It should be understood that the reference to a standard outer diameter for the tubular article is intended to refer to the outer diameter which the sizing die has been specifically designed to process. It should also be understood that the inner diameter of the body member 13 in the relaxed condition is somewhat less than the "standard" outer diameter of the tubular article to be processed as the sizing operation provides an "ironing" or densifying action on the tubular article outer surface to reduce the outer diameter of the tubular article accordingly. In addition, this relationship permits tubes having an outer diameter which falls slightly below the standard outer diameter during manufacturing to be properly processed in the sizing die of the invention.

Means are provided for attaching the body member 13 to the support member 11 to permit the introduction of a tubular article into the central bore 18. More specifically, the body member 13 is provided with a radially extending annular flange 23 adjacent the end 13a which is receivable in nested relationship within an annular recess 24 in the support member end wall 26 as shown in FIGURES 1, 2. The annular flange 23 is provided with a plurality of circumferentially spaced openings 27 for accommodating threaded bolts 28 or the like. The threaded bolts 28 are engageable within circumferentially spaced, internally threaded recesses 29 in the support member 11 to secure the body member flange 23 within the annular recess 24 with the body member 13 centrally arranged within the support member central bore 12 and in closely spaced, heat transfer relationship therewith as determined by the clearance gap 14.

Means are provided for heating the body member 13. In the illustrated embodiment, the heating means include an electrically operated, helically wound heating coil 31 positioned in encompassing relationship with the outer surface of the support member 11 as shown. With this heating arrangement, the support member 11 is heated by the coil 31 which heat is transferred to the body member 13 by conduction through the flange 23 and by convection and radiation from the support member central bore 12 to the body member 13.

In the operation of the invention, the heating coil 31 is connected to a suitable source of electrical power (not shown) to heat the body member 13 and a tubular article such as a paper tube, the outer surface of which is impregnated with a resinous material or the like, is introduced into the tapered opening 21 and advanced through the central bore 18 in the direction of the arrow I. The tapered surfaces 19 and 21 not only permit easy introduction of the tubular article into the body member central bore 18 but the compressing action of the body member 13 on the tube outer surface is gradually increased as the tube advances through the bore 18.

As the tubular article to be sized is of a standard outer diameter which is somewhat greater than that of the bore 18, the paper tube outer surface is both compressed and heated to reduce the outer diameter of the tube densifying its outer surface with an "ironing" action to provide a hard, dense, uniformly smooth, outer surface on the tube processed therein.

During the movement of the tubular article or tube through the central bore 18, the body member convolutions 15' yieldingly expand diametrically while maintaining a tight-fitting, sizing engagement between the tubular article outer surface and the central bore inner wall 19. As it is virtually impossible using present day techniques to manufacture paper tubes having a precisely controlled outer diameter, tubular articles such as tubes having outer diameters within a wide range above and below the standard outer diameter to be processed in the sizing die of FIGURES 1–3 are readily accommodated as the convolutions 15' expand and contract in the presence of oversize and undersize tubes respectively while maintaining a tight-fitting, sizing engagement between the inner wall 19 and the tube outer surface.

Figure 4:
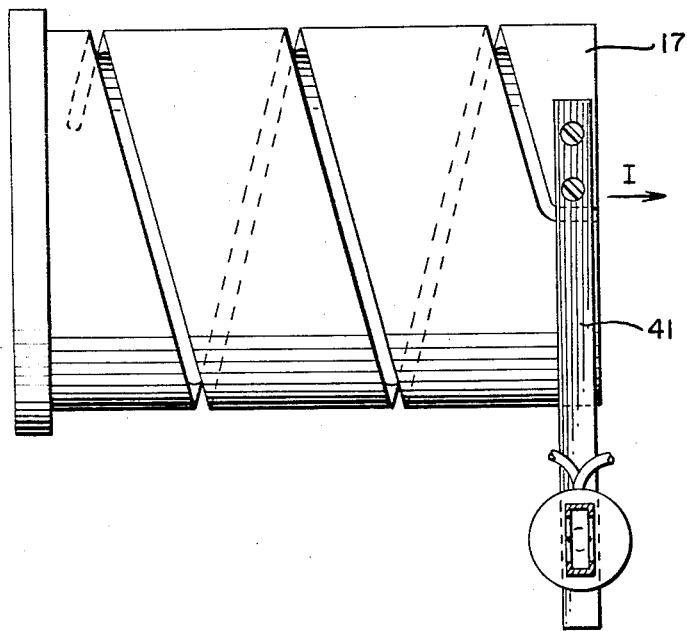
FIGURE 4 is a side elevation view of a portion of a modification of the sizing device of the invention.
Figure 4:
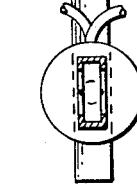
Figure 5:
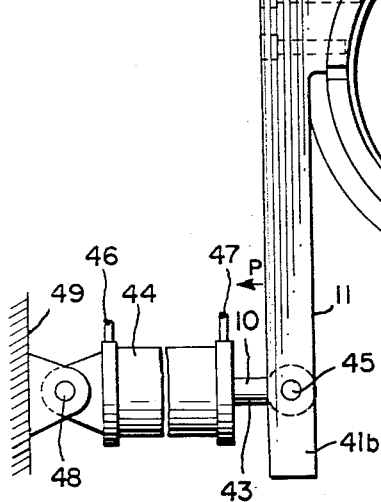
FIGURE 5 is an end view of the sizing device of FIGURE 4.

In the embodiment of FIGURES 4, 5, wherein like numerals are used to identify like parts, the free end 17 of the helically shaped strip 15 is provided with adjustable means for yieldably restraining the diametric expansion of the body member convolutions 15'. More specifically, an arm 41 is connected at one end 41a by suitable means such as threaded bolts 42 to the free end 17 preferably in tangentially extending relationship with the body member 13 as shown. The other end 41b of the arm 41 is pivotally connected at 45 to the piston 43 of adjustable fluid pressure means such as an hydraulic cylinder 44 communicating through conduits 46, 47 with a source of fluid pressure (not shown). The hydraulic cylinder 44 is pivotally connected at 48 to suitable support means such as a support member 49.

During the advance of a tubular article such as a paper tube in the direction of the arrow I through the bore of the body member 13 of FIGURES 4, 5, the diametric expansion of the convolutions 15' of the body member produced by the tube moves the arm 41 in the direction of the arrow P of FIGURE 5. This movement of the arm 41 in the direction of the arrow P is yieldably restrained by the piston 43 as a result of the fluid pressure introduced into the cylinder 44 through conduits 46, 47. Therefore, the piston 43 resists the diametric expansion of the convolutions 15' through the arm 41 increasing the sizing pressure on the outer surface on the paper tube to the desired degree. As can be understood, the amount of pressure exerted on the arm 41 through the piston 43 and consequently the degree of sizing pressure may be adjusted by suitable control means (not shown) by means of which the fluid pressure applied to the cylinder 44 is regulated.

With the novel construction of this invention, there has been provided a device for uniformly treating the outer surface of tubular articles such as a paper tube to provide a smooth, densified outer surface on such a paper tube particularly where the outer layer or layers of the paper tube are impregnated with a heat-setting resinous material. Furthermore, heating of the device of the invention may be easily accomplished and the simple construction of the invention provides an extremely low initial cost. An outstanding feature of the invention is the elimination of the problem heretofore presented as a result of variations in the outer diameter of paper tubes of a standard outer diameter manufactured under present-day manufacturing techniques using presently available sizing devices. Present day sizing devices frequently jam when processing slightly oversize tubes or fail to properly treat undersize tubes, both of which problems being avoided with the device of the invention regardless of tube outer diameter variations which are greater or less than the standard tube diameter over a wide range. The sizing device of the invention may be inexpensively manufactured from readily available materials so as to accommodate tubes of any selected size and the device functions continuously with the virtual elimination of operating problems to produce properly sized tubes at a relatively high production rate. Furthermore, another outstanding feature of the invention is the arrangement by means of which the sizing action of the device may be accurately controlled by a simple feature incorporated with the device of the invention.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A device for sizing a tubular article of fibrous material comprising, in combination, a support member, a helically shaped, tubular body member formed of a resilient material and having adjacent convolutions, said adjacent convolutions having side edges arranged in a spaced side-by-side relationship forming a continuous helically extending gap therebetween and defining a central bore having an inner wall for accommodating a tubular article of a standard outer diameter advancing therethrough in tight-fitting, sizing engagement with the outer surface of said tubular article, means for securing said body member to said support member to permit the introduction of said tubular article into one end of said central bore, means for heating said body member, said body member convolutions being arranged to yieldingly expand diametrically to accommodate tubular articles within a range of outer diameters above and below said outer diameter while maintaining said tight-fitting, sizing engagement between said tubular article outer surface and said central bore inner wall, said inner wall being tapered radially inward from said central bore one end, and adjustable means connected to the other end of said body member for yieldably restraining said diametric expansion of said body member convolutions and including an arm connected at one end to said body member other end in tangentially extending relationship with said body member and adjustable fluid pressure means engageable with said arm for yieldingly restraining the movement of said arm during said diametric expansion of the convolutions of said body member.

2. A tubular article sizing device in accordance with claim 1 wherein said body member comprises a helically shaped continuous strip of metallic material.

3. A tubular article sizing device in accordance with claim 1 wherein said support member is provided with a central bore and wherein said body member is positioned within said support member central bore in radially spaced apart relationship therewith.

4. A tubular article sizing device in accordance with claim 3 wherein said helically shaped body member includes an annular, radially extending flange on one end of said body member, and wherein said annular flange is secured to said support member by said securing means.

5. A tubular article sizing device in accordance with claim 4 wherein said support member is formed of metallic material and wherein said heating means is positioned in heat transfer relationship with said support member.

References Cited
UNITED STATES PATENTS

| 296,094 | 4/1884 | Williams | 118—125 |
| 2,239,159 | 4/1941 | Miller | 15—210 |
| 2,247,547 | 7/1941 | Fearn | 118—125 |
| 2,285,742 | 6/1942 | Miller | 15—210 |
| 2,434,565 | 1/1948 | Hill et al. | 118—125 |
| 2,657,414 | 11/1953 | Miller et al. | 15—210 |
| 2,866,217 | 12/1958 | Dean | 15—210 |
| 3,032,812 | 5/1962 | Van Riper | 15—210 X |

FOREIGN PATENTS

| 574,616 | 4/1959 | Canada. |

OTHER REFERENCES

German printed application 1,080,494, Apr. 28, 1960.

MORRIS KAPLAN, *Primary Examiner.*